United States Patent
Lika (10) Patent No.: US 11,846,557 B2
(45) Date of Patent: Dec. 19, 2023

(54) TORQUE AND FORCE TRANSDUCER

(71) Applicant: Bota Systems AG, Zurich (CH)

(72) Inventor: Klajd Lika, Zurich (CH)

(73) Assignee: Bota Systems AG, Zurich (CH)

( * ) Notice: Subject to any disclaimer, the term of this patent is extended or adjusted under 35 U.S.C. 154(b) by 69 days.

(21) Appl. No.: 17/325,314

(22) Filed: May 20, 2021

(65) Prior Publication Data

US 2021/0372872 A1 Dec. 2, 2021

Related U.S. Application Data

(60) Provisional application No. 63/031,774, filed on May 29, 2020.

(51) Int. Cl.
*G01L 5/00* (2006.01)

(52) U.S. Cl.
CPC .......... *G01L 5/0019* (2013.01); *G01L 5/0004* (2013.01)

(58) Field of Classification Search
CPC ..... G01L 5/161; G01L 1/2231; G01L 5/0004; G01L 5/0019
See application file for complete search history.

(56) References Cited

U.S. PATENT DOCUMENTS

| | | | | |
|---|---|---|---|---|
| 6,871,552 B2 * | 3/2005 | Liu | ........................... | G01L 1/22 73/862.041 |
| 8,006,574 B2 * | 8/2011 | Meyer | ..................... | B62J 45/421 73/862.321 |
| 8,845,197 B2 * | 9/2014 | Hasenzahl | .............. | A61B 90/06 433/114 |
| 9,448,128 B2 * | 9/2016 | Kim | ....................... | G01L 5/1627 |
| 9,778,122 B2 * | 10/2017 | Meyer | ........................ | G01L 5/00 |
| 9,869,597 B1 | 1/2018 | Reich | | |
| 2006/0037409 A1 * | 2/2006 | Ichige | .................... | G01L 5/1627 73/862 |
| 2009/0301217 A1 * | 12/2009 | Kurtz | ....................... | G01L 5/223 73/847 |
| 2020/0284667 A1 * | 9/2020 | Glusiec | ................... | G01L 5/0057 |

FOREIGN PATENT DOCUMENTS

| | | | |
|---|---|---|---|
| CN | 106706188 A | * 5/2017 | |
| EP | 1353159 A2 | * 10/2003 | ........... G01L 3/1457 |

OTHER PUBLICATIONS

International Searching Authority, the International Search Report and Written Opinion of the International Searching Authority for International Application No. PCT/IB2021/054584 dated Aug. 27, 2021, 8 pages.

* cited by examiner

*Primary Examiner* — Octavia Davis Hollington
(74) *Attorney, Agent, or Firm* — Rimon PC; Marc S. Kaufman (57) ABSTRACT

A six-axis Force Torque Transducer (FTT) including a hub and at least one flexural beam disposed on the hub and extending outwardly from the hub. Each of the at least one flexural beams including a U-beam having a substantially U-shaped cross section and at least one beam plate attached to the U-beam at a portion of the U-beam that is remote from the hub. A first strain gauge carrier, including at least one strain gauge, is mounted on an exterior surface of the at least one U-beam. A second strain gauge carrier, including at least one strain gauge, is mounted on an exterior surface of the at least one beam plate. A connection element electrically connects the strain gauges of the first strain gauge carrier and the strain gauges of the second strain gauge carrier in a bridge configuration.

4 Claims, 6 Drawing Sheets

Figure 6

TORQUE AND FORCE TRANSDUCER

RELATED APPLICATION DATA

This application claims benefit of U.S. Provisional Application Ser. No. 63/031,774 filed on May 29, 2020, the entire disclosure of which is incorporated herein by reference.

FIELD OF THE INVENTION

The disclosed implementations relate to the field of force measurements using strain gauges attached to deformable structures. Specifically, the disclosed implementations relate to a force torque transducer (FTT) that can be used to measure three orthogonal forces and three orthogonal torques and the method of measurement.

BACKGROUND

Traditional six-axis FTTs translate applied forces and torques into voltage, resistance, capacitance or current. A deformable mechanical structure is used and when loaded, the surfaces on the structure are deformed. Strain gauge sensors are used to translate the deformation to a change in resistance, voltage, capacitance or current. This change in the signal is then measured by electronics that digitize the analog signal (known as an "A/D convertor") for processing by a computer in a known manner. Such FTTs can be used, for example, in various robotics applications. In order to extract the three orthogonal force and three orthogonal torques that are applied to the sensor, a minimum of six strain measurements must be obtained from different locations on the deformable structure of the FTT. Each of the strain measurements are usually acquired by a resistive a strain sensor, also known as "resistive strain gauge" (SG). The arrangement of the SGs on the mechanical structure and the geometry of the mechanical structure directly affect the production costs and quality of the FTT.

The sensing element of a six axis FTT is usually composed of two high stiffness hubs that bear the applied loads, and are connected through one or more rectangular flexural beams radially and equally spaced. Between the flexural beams and one or two of the high stiffness hubs, compliant sections for mechanical decoupling of the forces applied exist. The strain gauges are attached to the surfaces of the flexural beams.

In order to measure all six force and torque components, the most common FTTs have the SGs attached on surfaces that are not on the same tangent plane and usually are 90 degrees offset with one each other with respect to one axis. In order to form half or full Wheatstone bridges (a "bridge") these SGs are connected with electrical connections, such as wires. The most common arrangement is a rectangular cross-section beam and with SGs affixed on all four surfaces. The beam can be hollow to provide higher mechanical flexibility. At least three of these beams are required to create a sufficient number of signals (at least six) to resolve three orthogonal forces and three orthogonal torques. This method allows for design of very compact FTTs because all available surfaces on the flexural beams are utilized for strain measurements. However, in such a design it is difficult to access the surfaces to attach and solder the wires for the SGs. Therefore, manual handling and custom tools are usually required and manufacturing costs are high. In general, strain gauge attachment is a time consuming process that requires manual handling, special tools and equipment and highly skilled personnel.

In some cases, only one or two surface sections on the same or slightly inclined planes are sufficient to produce adequate signals that are sensitive enough to resolve two vertical forces. The strain gauges in that case are either combined in quarter bridges and/or in half bridges to resolve the necessary two components of each beam. This design renders the production of the FTT more compatible with automation and reduces significantly the cost as it makes it easier to access the SG connecting pads for soldering. In some cases, instead of soldering wires, a PCB is used to connect the SGs accordingly by simply touching the terminal pads of the SGs. However, the strain gauges are used to measure normal strain and decoupling of the signals is proportional to the distance from the neutral axis of the beam. Therefore, to reach the accuracy and sensitivity levels of the first example sensor discussed above, the beam must be wider resulting in an FTT with larger diameters for the same SGs.

Moreover, temperature compensation is only achieved by attaching an external sensor to a non-stressed surface. The disadvantage of this external sensor attachment, is that the heat transfer between the two surfaces is relatively slow. The temperatures in these two surfaces are therefore not synchronized and drift becomes a problem. Moreover, heat dissipation is not symmetrical and is highly affected by the external boundary temperature conditions.

In another example, the strain measurements can be partly normal and partly in shear. In such a case, the strain gauges are all placed all on top of one surface and easier manufacturing is also achieved. However, in this case the mechanical structure becomes complex and therefore more expensive.

Generally speaking, the instrumentation of an FTT by adhering SGs is one the most important parts of the costs associated with the production. The FTTs are expensive because they require customized machinery for manufacture. Further, special algorithms are developed to compensate for temperature influences and quality control of the produced sensors becomes difficult when many wires are soldered on a small device.

SUMMARY

The disclosed implementations include an FTT which converts three orthogonal force components and three orthogonal torque components applied to it, into six or more electrical signals. The implementations allow the design and manufacture of a compact six axis FTT without the need for special equipment and tools. The FTT can be used, for example, for force feedback in robots for small fingertip sensing or larger force manipulation tasks where force sensitivity and control are critical.

The core components of the invention are a tool mounting stiff hub, one or more stiff mounting fixtures, a structure able to mechanically deform (referred to as a "flexural beam"). The flexural beam is composed of a beam with a substantially U-shaped profile, in cross section, attached to two straight plate beams. A full bridge SG group electrical circuit able to measure shear strain is disposed on the U-profile outer surface, and two half bridge strain gauge groups, connected together and able to measure shear strain are disposed on the straight plate beam. A Printed Circuit Board (PCB) is provided to include any necessary electronics and/or connections.

The aforementioned components can be configured as follows: The stiff hub is connected with the stiff mounting fixture(s) by three flexural beams, which are arranged radially. They form one monolithic structure that can be manufactured by milling or other techniques. The full bridge strain gauge group is affixed on the U-profile beam of the flexural beam. In one implementation, instead of the full bridge, a half bridge shear strain gauge group is used and the rest of the bridge is completed by resistors. Two half-bridge strain gauge groups are affixed on the two straight plate beams of the flexural beam to form a full bridge. In one implementation, a set of single shear strain gauges are affixed on the straight plate beams to from a half bridge and the rest of the bridge is completed by resistors. The strain gauges can be connected electrically through the PCB to form the aforementioned half bridge and full bridge. The flexural beam outside surfaces that the SGs are attached are used to measure shear strain that are produced by two applied and vertical forces. These surfaces are easy to access and thus the strain gauges can be adhered manually without the need for special equipment to gain access to the surfaces. Moreover, the surfaces are used for the compliance of the sensor that is required to mechanically decouple the applied forces of the FTT reference frame. Therefore, all available and accessible surfaces are utilized in the most efficient way and the manufacturing is easy and inexpensive and the resulting FTT is very compact.

The strain gauges for each one of the two forces are electrically connected in a manner which compensates for temperature fluctuations in the structure. In particular, the SGs are symmetrically arranged on the same flexural beam and share the same temperature with very a very small delay/delta because they are very close to each other. Moreover, the strain gauges are temperature compensated with respect to the material they are attached to.

The six signal outputs are used to re-construct three forces and three torques applied through a calibration process with ground truth measurements, on the selected reference frame of the transducer. The disclosed implementations can be used to manufacture ultra-compact high performance six-axis force torque transducers with off the shelf strain gauges, compatible with current industrial robotic systems. Furthermore, it should be noted that the disclosed implementations do not require special assembly skills or tools, which results in low manufacturing costs.

A disclosed implementation is a six-axis Force Torque Transducer (FTT) comprising: a hub; at least one flexural beam disposed on the hub and extending outwardly from the hub each of the at least one flexural beams including a U-beam having a substantially u-shaped cross section and at least one beam plate attached to the U-beam at a portion of the U-beam that is remote from the hub; a first strain gauge carrier, including at least one strain gauge, mounted on an exterior surface of the at least one U-beam; a second strain gauge carrier, including at least one strain gauge, mounted on an exterior surface of the at least one beam plate; and a connection element for electrically connecting the strain gauges of the first strain gauge carrier and the strain gauges of the second strain gauge carrier in a bridge configuration.

There can be three U-beams extending radially from the hub and each U-beam can have two beam plates attached thereto. A plurality of mounting fixtures can respectively couple distal ends of each of the beam plates to a distal end of a corresponding one of the beam plates attached to an adjacent one of the U-beams.

Each of the at least one U-beams can include two substantially parallel plates and an orthogonal connecting plate. The first strain gauge carrier can be mounted on the orthogonal connecting plate. The second strain gauge carrier can be disposed in a plane that orthogonally intersects a plane defined by the exterior surface of the at least one beam plate.

BRIEF DESCRIPTION OF THE DRAWINGS

The present invention is illustrated by way of example and not limitation in the FIGS. of the accompanying drawings in which like references indicate similar elements.

DETAILED DESCRIPTION

Various disclosed implementations will be described with reference to details discussed below, and the accompanying drawings will illustrate the various implementations. The following description and drawings are illustrative of the invention and are not to be construed as limiting the invention. Numerous specific details are described to provide a thorough understanding of various disclosed implementations. However, in certain instances, well-known or conventional details are not described in order to provide a concise discussion of the disclosed implementations. Positional terms, such as "top", "bottom" and "side" are used herein as relative descriptors and the implementations can be positioned in any orientation and/or frame of reference.

Figure 1:
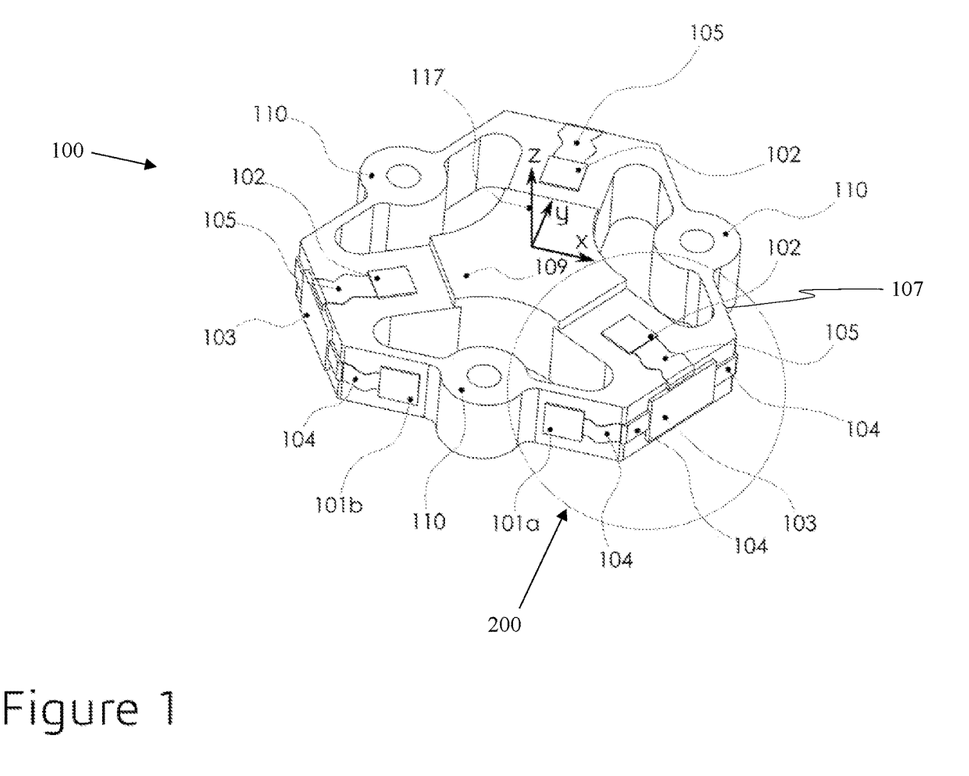
FIG. 1 is a perspective view of a six axis FTT with three flexural beams, their high stiffness hubs, the SGs arrangement and PCBs, and Cartesian reference frame according to disclosed implementations.

FIG. 1 is a perspective view of an FTT 100 in accordance with disclosed implementations. The FFT 100 includes a tool mounting stiff hub 109, three stiff mounting fixtures 110, and at least one metallic or non-metallic structure 200, only one of which is labeled in FIG. 1, able to mechanically deform (referred to as "flexural beams 200" herein). The flexural beams 200 are described in greater detail with respect to FIG. 2 below. Compliant sections 107 of the flexural beams 200, designed for mechanical decoupling of the applied forces, are defined on a portion of the flexural beams 200 that connects to the hub 109. Shear type SGs strain gauge sets 101a, 101b are attached to surfaces of the respective flexural beam 200 and are connected electrically to a PCB 103 which includes appropriate electrical elements to define half bridge or full bridge connections in a known manner.

Figure 2:
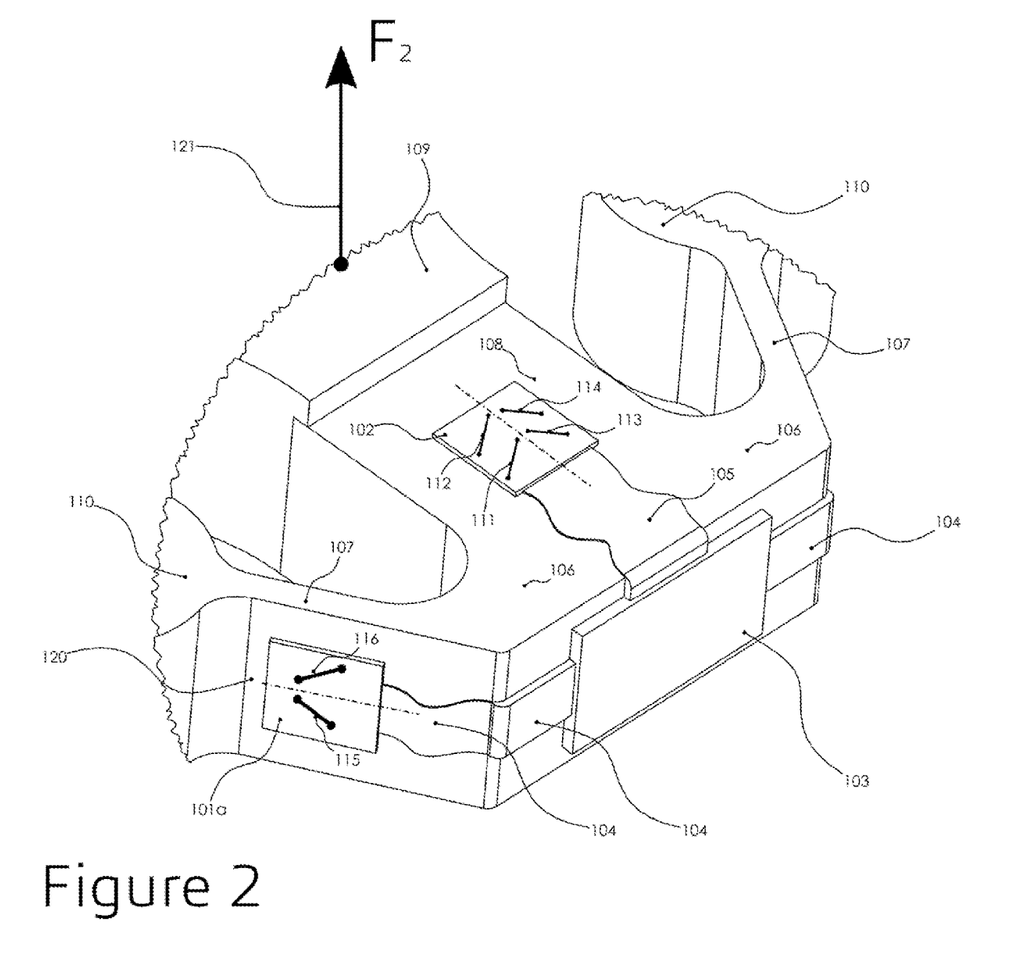
FIG. 2 is a detailed perspective view of a flexural beam of FIG. 1 according to disclosed implementations.

FIG. 2 illustrates one of the flexural beams 200 of FIG. 1 in more detail. The flexural beam 200 is composed of a U-beam 108 having a U-profile cross section (see FIG. 3a) rigidly attached, by element 106, to two straight plate beams 107. A full bridge of four strain gauges (111, 112, 113, 114) attached to a top surface of U-beam 108, through carrier 102 in a manner configured to measure shear strain of the u-beam 108. Two half bridge strain gauge carriers 101a and 101b are attached in a manner able to measure shear strain on the straight plate beams 107 with SGs 115 and 116. The SGs are electrically connected to the PCB 103 through electrical connections 104 and 105 which can include wires. The hub 109 is connected to the stiff mounting fixtures 110 respectively by the three flexural beams 107, which are arranged radially. Accordingly, these elements form one integral structure that can be manufactured through conventional techniques, such as milling or casting techniques.

Figure 3A:
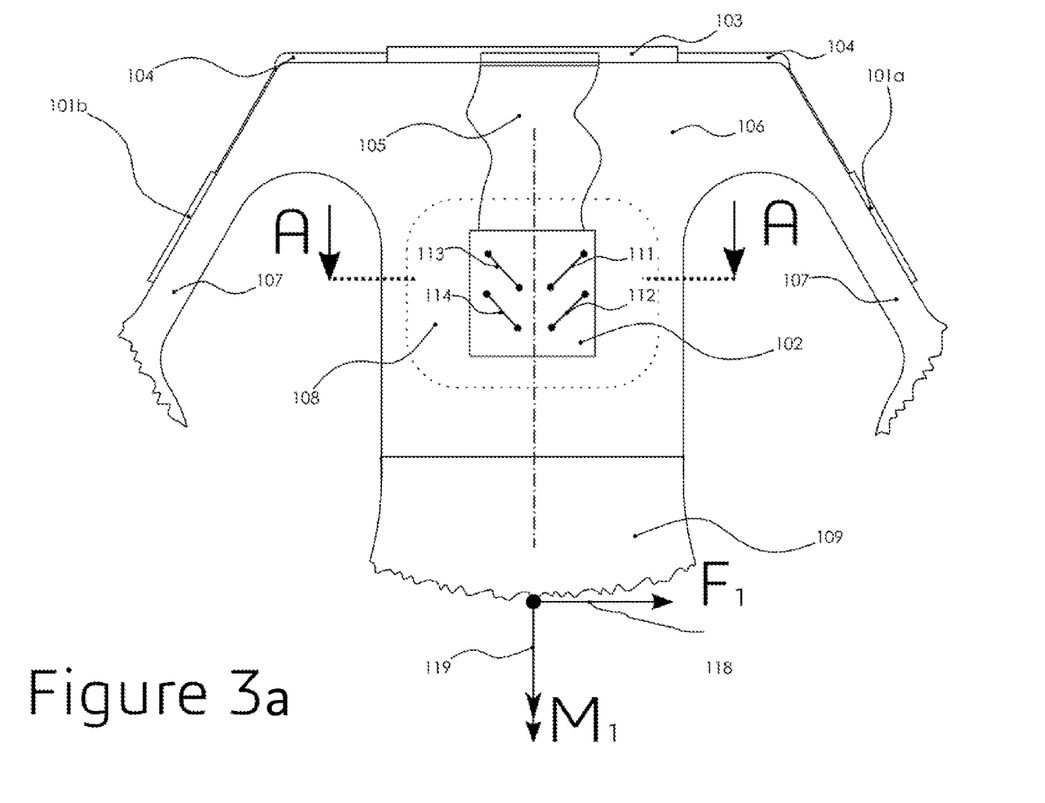
FIG. 3a is a top view of the flexural beam of FIG. 2.
Figure 3B:
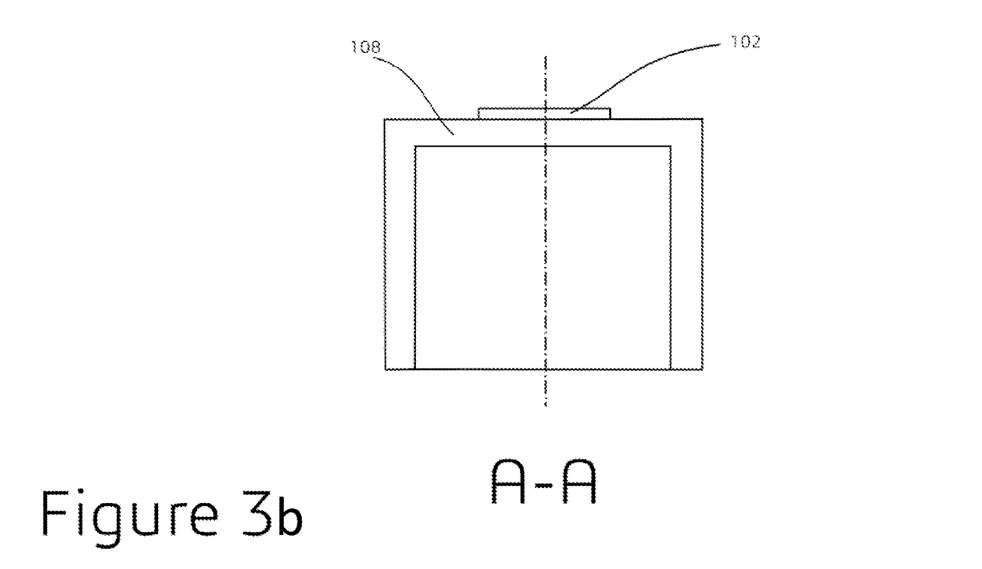
FIG. 3b is a cross section view of the U-profile part of the flexural beam, with the SG on top of it, according to disclosed implementations.

FIG. 3a illustrates a top view of a flexural beam 200. FIG. 3b illustrates the U-beam 108 in cross section. Note that the U-beam 108 is substantially U-shaped in cross-section. The phrase "substantially U-shaped", as used herein, refers to an structure that has two substantially parallel elements connected by a substantially orthogonal element. This can include the flat elements connected at 90 degree angles as shown in FIG. 3b or somewhat curved elements connected that approximate the letter U in cross sectional shape.

Figure 5A:
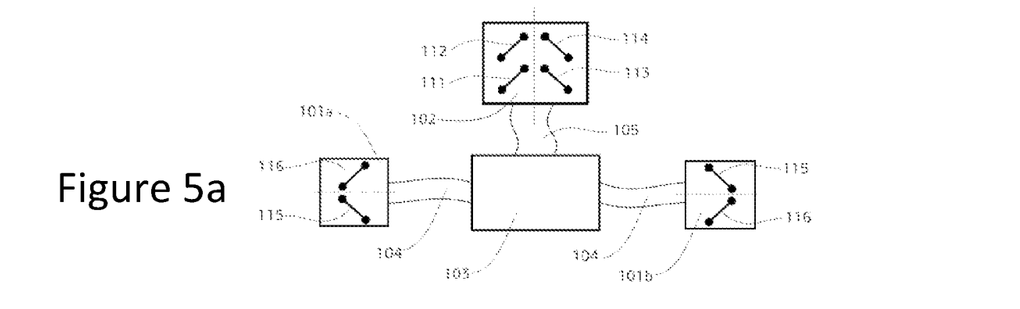
FIGS. 5a, 5b, 5c, 5d are schematic illustrations of examples of combinations of the SGs in accordance with disclosed implementations.

The carrier 102 is affixed to the U-beam 108 of the flexural beam 200. As shown in FIGS. 3a and 3B, the carrier 102 is adhered to an outer top surface of the U-beam 108. The shear strain field, of the surface on which the carrier 102 is attached, is approximately homogenous. When a shear force F1 (see FIG. 2) which is 45 degrees from the orientation of the strain gauge main deformation direction, is applied on the FTT a homogeneous shear strain field is produced. The SGs are aligned with the principal strains. Each one of the four SGs of the full bridge set attached is experiencing the same strain magnitude. Two of them are compressed and two of them are stretched. FIG. 5a illustrates the Wheatstone bridge electrical connection, which is able to produce an electrical signal when a Force F1 is being applied on the flexural beam.

Figure 5B:
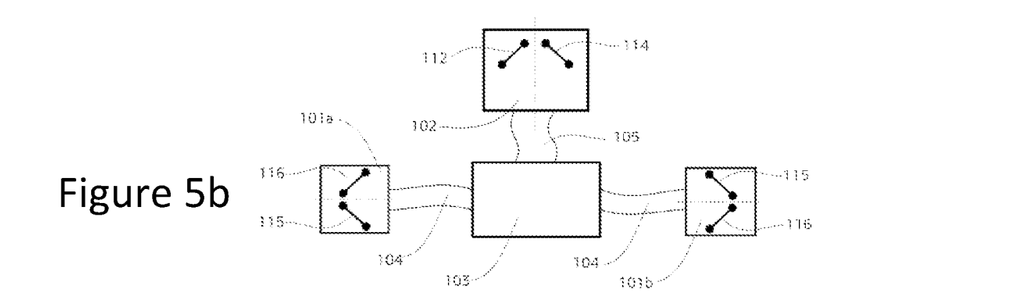
Figure 5C:
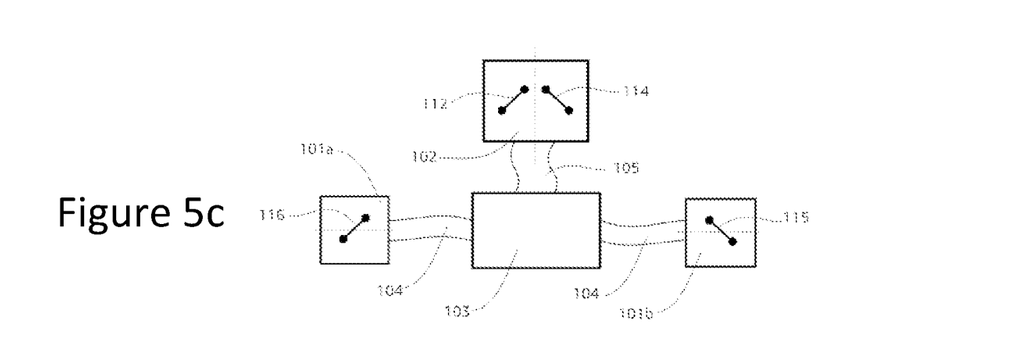

In another implementation, the carrier 102 can be attached on the bottom surface of the U-profile of the U-beam. In another implementation, only two strain gauges are used to form a half bridge on the carrier 102 as shown in FIG. 5c. This arrangement is able to produce an electrical signal from the applied force F1 applied. In this implementation, SGs of the same sensitivity will produce half of the signal magnitude. This implementation is advantageous when strain gauges of higher sensitivity are used and can result in a more compact FTT. FIG. 5b shows another combination of one half bridge used on the U-beam to measure F1 forces and two half bridges attached to the rectangular beams to measure F2 forces.

In another implementation, two half bridge shear SG carriers can be attached on the opposite faces of U-beam 108. This embodiment is advantageous because it eliminates the coupling that comes when a torque M1 is applied and the beam behave only as a uniaxial load cell able to produce a signal only when a force F1 is applied and the torque M1 is eliminated.

The strain gauges can be temperature matched and compensated for the material of the flexural beam in a known manner. Moreover, when the strain gauges are attached in the same area of the sensors, i.e., physically proximate one another, the temperature difference is generally negligible. Therefore, each one of the U-profile beam signals of the overall FTT are temperature compensated by the way the strain gauges are arranged and electrically connected.

With reference to FIG. 3, straight plate beams 107 are used to mount the strain gauges required to measure vertical force F2 (121). The disclosed implementations can use straight plate beams 107 for the compliance required by the FTT to decouple all applied force and torque components, especially that of Fx, Fy and Mz. This combination means that every available surface is used to mount the strain gauges and result in a very compact six axis FTT. The SG carriers 101a and 101b (see FIG. 1) mounted on these surfaces are also shear type and produce a signal when a vertical force is applied on the flexural beam. Each carrier can carry two strain gauges 115 and 116 (see FIG. 2) that form a half bridge shear strain gauge set arranged and aligned with the principal strain induced from the force, usually in 45 degrees from the horizontal line 120 as shown in FIG. 2. The strain gauges can be aligned 90 degrees from one another. When force F2 is applied, two of the strain gauges are compressed and two are stretched in the same manner as the strain gauge set of 102 described in a previous paragraph. The difference is that these SG sets are electrically connected with one each other through the PCB 103. They are temperature compensated to match the material they are attached to and they are placed between the high stiffness parts of the FTT 109 and 110. They are symmetrically placed and any temperature difference from one surface to the other is negligible. Moreover, they are electrically connected to reject the strain induced from temperature change in the flexural beam.

Figure 5D:
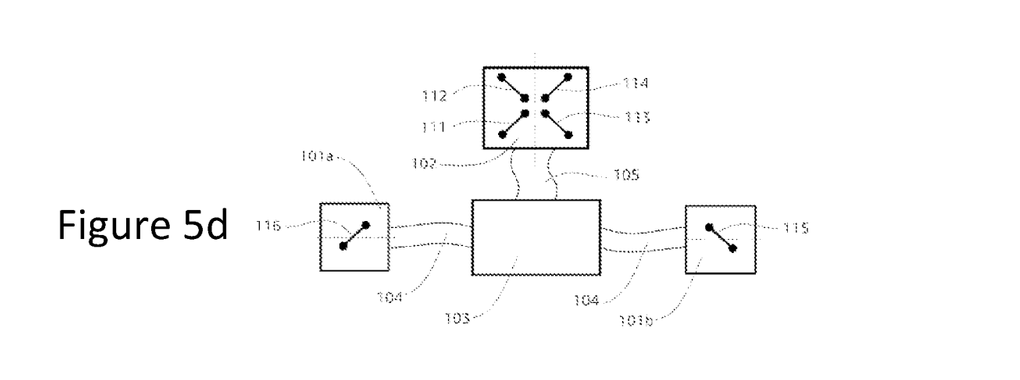

In another implementation the carriers 101a and 101b can include only one strain gauge each, that are aligned 45 degrees from the horizontal line 120 or orientated across the principal strain induced from the forces. They can be connected in half bridge configuration with the PCB 103 as shown in FIG. 5d.

Figure 4A:
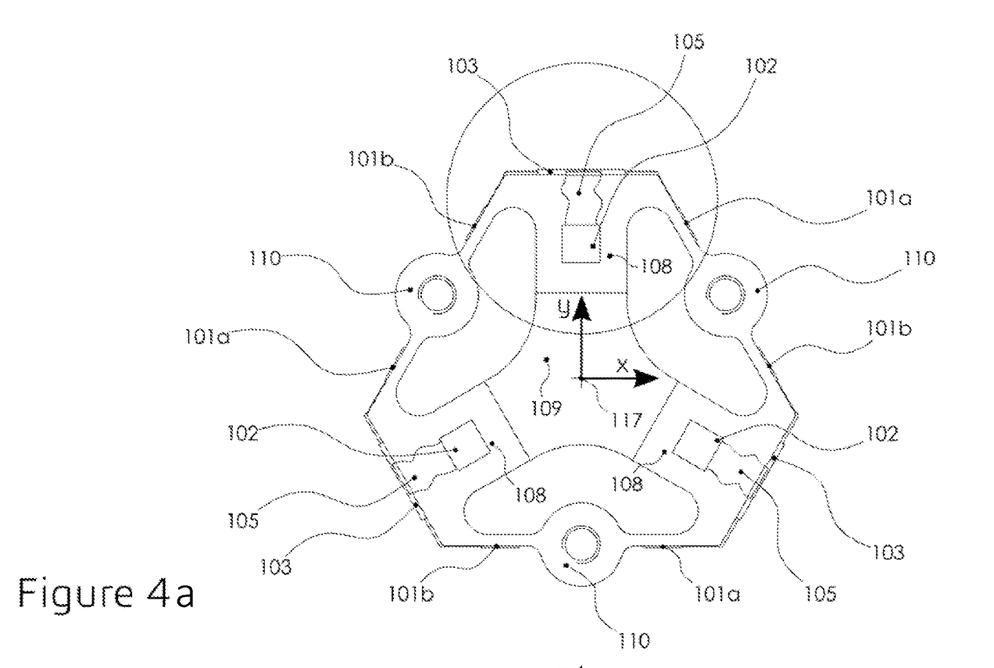
FIG. 4a is a top view of a six axis FTT in accordance with disclosed implementations and including a Cartesian reference frame.
Figure 4B:
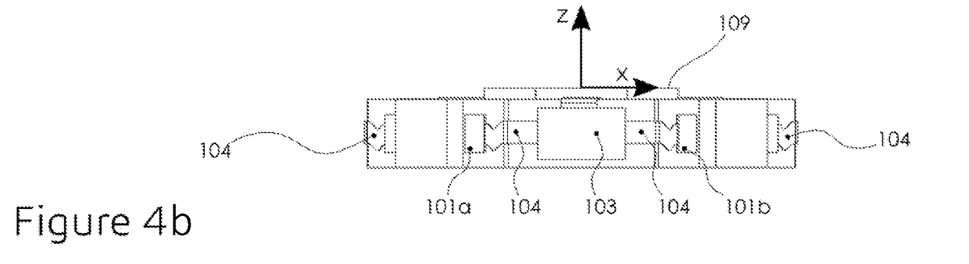
FIG. 4b is a side view of the FTT of FIG. 4a including a Cartesian reference frame.

FIG. 4a illustrates a top view diagram of the aforementioned implementation with three flexural beams 108 connected to form a complete six axis FTT. The FTT may use the stiff mounting fixtures 110 mounted on a high rigidity housing or adapter and 109 to the side of the applied forces. In this embodiment the reference frame 117 for the three forces and torques is chosen to be the on the top surface of housing or adapter 109. FIG. 4b is a side view of the implementation of FIG. 4a where the reference frame x axis and z-axis are shown.

FIG. 5 illustrates a developed view of the other embodiments of the invention with possible combinations of SGs used in the flexural beam discussed. One can see that there are five or more possible combinations to measure the shear strains that are induced from the two vertical forces that are applied on the flexural beam.

Figure 6:
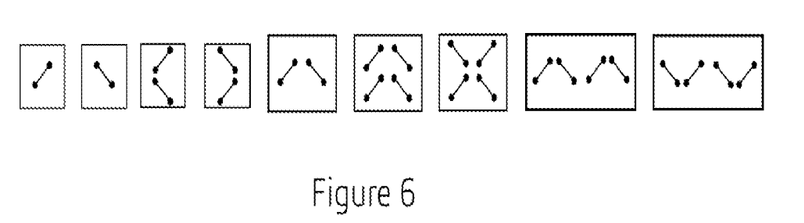
FIG. 6 is a schematic top view of several arrangements of SGs on carriers that can be used in accordance with disclosed implementations.

FIG. 6 illustrates a diagram of several types of SG carriers and their SGs that can be used in other embodiments of the invention. The SGs can be arranged at 90 degrees from one another and aligned with the principal strain induced from the applied shear stresses. There can be one, two, three or even four strain gauges in one strain gauge carrier. The strain gauges can be arranged in any of the patterns shown in FIG. 6. Known metal foil or semiconductor foil resistive SGs can be used to convert the strain to electrical resistance change. Metal SGs are cheaper, can measure larger strains typically, and are more robust but they have small gain factors. Semi-conductor SGs can be expensive, fragile, difficult to handle but they are preferred when sensitivity is a critical matter because they have high gain factors. Due to their higher sensitivity the electronics can be minimized resulting in very compact FTT.

The plurality of the strain gauges can be connected through the PCB to form the aforementioned half bridge and full bridge in a known manner. The SGs can be attached to outside surfaces of the flexural beam to measure shear strain that is produced by two applied and vertical forces. These surfaces are easily accessible for mounting and adherence of the strain gauges manually with an adhesive, without the need for special equipment. The beams also are utilized for compliance of the sensor that is required to mechanically decouple the applied forces of the FTT reference frame. Therefore, all surfaces are utilized in the most efficient way, manufacturing is simple, and the resulting FTT is inexpensive and compact.

The SGs can be electrically connected in such a way to compensate for temperature fluctuations on the structure. Th SGs can be symmetrically arranged on the same beam to share the same temperature with very small delay due physical proximity. Moreover, the strain gauges used in this invention are temperature compensated to the material they are attached on. The six signal outputs can be used to re-construct three forces and three torques applied through a calibration process with ground truth measurements, on the selected reference frame 117 of the transducer using the least squares methods. The implementations can be used to manufacture ultra-compact high performance six-axis force torque transducers with off the shelf strain gauges, compatible with current industrial robotic systems.

The invention has been described with respect to various implementations. One of skill in the art will understand that various modifications can be made without departing from the scope of the invention as defined in the appended claims.

What is claimed is:

1. A six-axis Force Torque Transducer (FTT), comprising:
    a hub;
    at least one flexural beam disposed on the hub and extending outwardly from the hub, each of the at least one flexural beams including a U-beam having an orthogonal element and two substantially parallel elements extending downward from a bottom surface of the orthogonal element to define a substantially U-shaped cross section and at least one beam plate attached to the U-beam at a portion of the U-beam that is remote from the hub;
    a first strain gauge carrier, including a full bridge of strain gauges, mounted on an upper exterior surface of the orthogonal element of the at least one U-beam in a manner configured to measure shear strain of the at least one U-beam, wherein the full bridge of strain gauges includes two pairs of strain gauges including a first strain gauge pair and a second strain gauge pair, each of the two pairs of strain gauges being positioned on the carrier to have a main deformation direction whereby a shear force $F_1$ applied to the hub in a direction orthogonal to a longitudinal axis of the orthogonal element will cause the first strain gauge and the second strain gauge to experience the same strain magnitude with the first strain gauge being in compression and the second strain gauge being in tension;
    two second strain gauge carriers, each including a half bridge of strain gauges, mounted on an exterior surface of the at least one beam plate in a manner configured to measure shear strain of the at least one beam plate, wherein the half bridge includes at two strain gauges positioned on the at least one beam plate to have a main deformation direction aligned with a principal strain induced by the shear force $F_2$ applied to the hub in a direction 90 degrees from $F_1$ and normal to a surface of the first strain gauge carrier; and
    a connection element for electrically connecting the strain gauges of the first strain gauge carrier and the strain gauges of the second strain gauge carriers in a bridge configuration.

2. The FTT of claim 1, wherein there are three U-beams extending radially from the hub and wherein each U-beam has two beam plates attached thereto and further comprising a plurality of mounting fixtures respectively coupling distal ends of each of the beam plates to a distal end of a corresponding one of the beam plates attached to an adjacent one of the U-beams.

3. The FTT of claim 1, wherein the second strain gauge carriers are disposed in a plane that orthogonally intersects a plane defined by the exterior surface of the at least one beam plate.

4. The FFT of claim 1, wherein each the strain gauges in the full bridge of strain gauges are mounted at a 45 degree angle with respect to a longitudinal axis of the U-beam.

* * * * *